Sept. 15, 1942.  E. OJALVO  2,296,000
ADVERTISING DEVICE, TOY, AND/OR MUSICAL CHIME
Filed Aug. 30, 1941
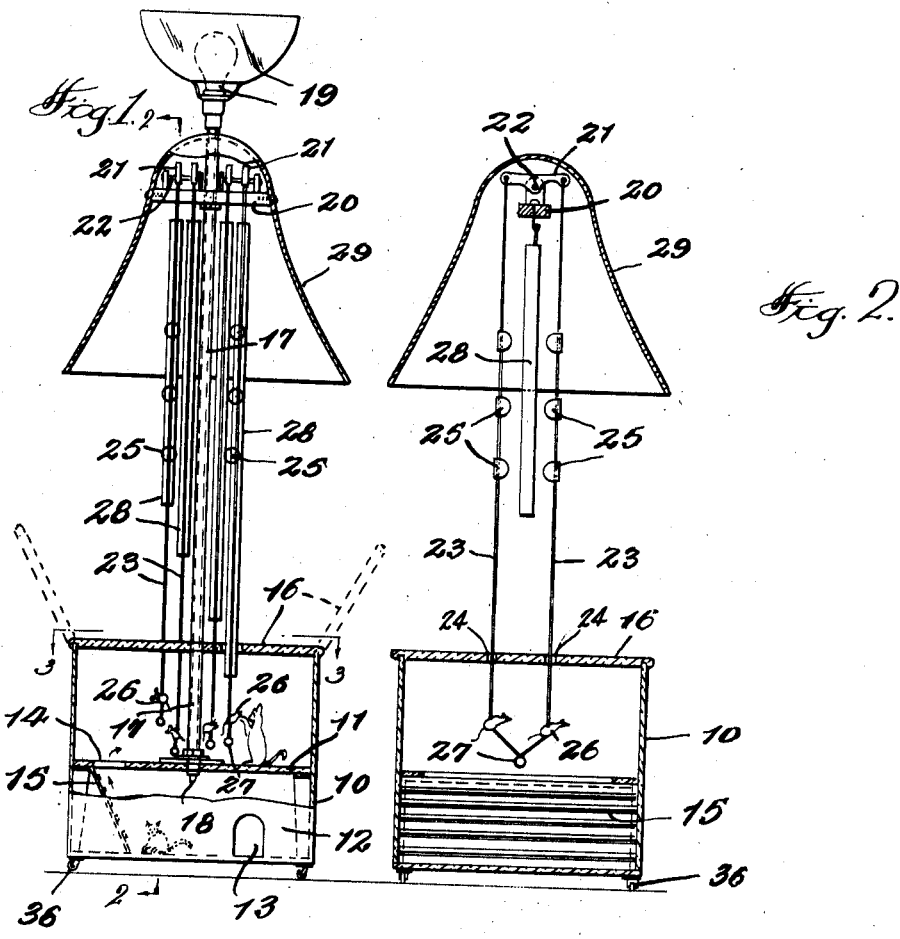
Inventor
Edmond Ojalvo,
By Christian R. Nielsen
Attorney

UNITED STATES PATENT OFFICE 2,296,000

ADVERTISING DEVICE, TOY, AND/OR MUSICAL CHIME

Edmond Ojalvo, New York, N. Y.

Application August 30, 1941, Serial No. 409,089

5 Claims. (Cl. 272—86)

This invention relates to an advertising device, toy and musical chimes, and it consists in the construction, arrangements and combinations herein described and claimed.

It is a particular object of the invention to provide an advertising device or toy in which musical chimes are employed, the latter being animal-operated, which under operation as an advertising device will attract attention, and where employed as a toy will afford amusement to observers.

It is also an object of the invention to provide a novel supporting base for the device, an upright standard of which may be employed as a support for an illuminating means, as well as the chimes.

It is a still further object of the invention to provide a device embodying musical chimes, which are to be animal-operated, in which the supporting base is of transparent material, enabling observation of the animal or animals during play and endeavors to secure a suspended bait, thereby effecting operation of the chimes.

Additional objects, advantages and features of invention will be apparent from the following description, considered in conjunction with the accompanying drawing, wherein, Figure 1 is a vertical section of the device, partly in elevation.

Figure 2 is a vertical section on the line 2—2 of Figure 1.

Figure 3 is a cross section on the line 3—3 of Figure 1.

Figure 4 is an enlarged sectional view of a modified form of the device.

Referring more particularly to Figures 1 to 3, there is shown a base 10 which may be of any approved size and shape, in the present instant a substantially square structure being shown. The walls, top and bottom of the base 10, as well as the horizontal floor 11 is formed of a transparent material, such as glass, and one or more of the walls 12 is provided with an opening 13, for a purpose presently to be explained.

The floor 11 has an opening 14 to which stairs 15 lead from the base of the structure.

The top 16 is transparent and consists of a pair of sections hingedly connected to respective side walls of the base, permitting these sections to be swung upwardly and outwardly to an open position, as indicated in dotted lines, permitting ample ventilation to an animal or animals when inside the structure, as will be explained hereinafter.

Upon the floor 11 there is rigidly supported an upright 17 of tubular form, for current conducting wires 18 which lead to a bulb and shade 19 at the upper end thereof. Also, the upright 17 has a cross arm 20 fixed thereto, upon which there is mounted a plurality of rocker arms 21. The rocker arms are pivoted intermediate their lengths as at 22 and upon the free ends a cord 23 is secured, the cords passing downwardly and extended through suitable apertures 24 formed in the top sections of the base. The sections of the top will also be suitably formed to accommodate the upright 17. Each of the cords will include a plurality of weights 25 suitably spaced along their lengths as shown.

At the base of each cord 23 there is secured a bait 26, positioned within the base, as clearly shown in Figures 1 and 2. The bait 26 may be in any suitable form, such as the representation of any popular product, but in the present instance, the bait is in the form of a mouse. The bait will be filled with a suitable material to entice an animal into the base, such as catnip, which would induce kittens to enter through the opening 13, ascend the stairs 15 in an effort to reach the bait.

The cords 23 are preferably arranged in pairs connected at their lower ends where a weight 27 is secured. The weight 27 tends to hold the cords under slight tension.

Between each pair of cords 23 a musical chime 28 is suspended adapted to be struck by the weights 25 under movement of the cords 23, such movement being effected when a kitten, for instance, becomes playful or attempts to secure the bait.

In order that the upper working mechanism of the device may be concealed, a suitable shade 29 may be employed, supported by and above the cross arm 20.

In some instances, it might be desirable to impart an up and downward movement of the cords 23, and such a mechanism is shown in Figure 4. In this instance, the cross arm, rocker arms, cords and chimes are arranged as previously described, but in addition, a lever 30 is fixed to the pivot 22. A clock mechanism 31 is employed which may be secured to the shade 29 as shown, or otherwise. The clock mechanism will include a winding stem 32 as is customary. A cam 33 is mounted on a shaft 34 of the mechanism for actuating a lever 35. A link 36 is connected between the lever 35 and the lever 30. Thus, it will be apparent that upon rotation of the cam, an up and down motion will be imparted to the lever 35, which in turn rocks the lever 30, from which a rocking motion will be imparted to the rocker arms 21. Such motion will cause upward and downward movement of the bait, causing greater excitement and attraction for a kitten to seize the bait.

The base may include casters 36 making the device readily portable.

From the foregoing it will be seen that I have provided a device which will be highly amusing as a toy or advertising device and in the latter case the sound of the chimes will attract attention of passing persons when the device is displayed in a show window or the like.

While I have shown and described a preferred form, this is by way of illustration only and I consider as my own, all such modifications in structure as fairly fall within the scope of the appended claims.

I claim:

1. An animal-operated advertising device comprising a base of hollow transparent formation, a horizontal wall therein, an animal entrance opening formed in one wall of the base, said horizontal wall having an opening therein, a stair leading to said last named opening, an upright standard secured to the horizontal wall, a cross arm carried by the standard, a plurality of chimes suspended from the cross arm, a plurality of rocker arms mounted above the cross arm, a strand connected to the swinging ends of the cross arms and suspended therefrom in close relation to the chimes, each strand having a plurality of spaced weight members fixed thereto, said strands extending through the top of the base above the horizontal wall and each strand having bait means secured to the end thereof.

2. The structure of claim 1 in which the standard includes a shade device adapted to conceal the cross arm and the rocker arms.

3. The structure of claim 1 in which the top wall is formed in hinged sections adapted to be swung to an open position.

4. The structure of claim 1 in which said rocker arms are moved upwardly and downwardly alternately to impart corresponding movements to the strands and the suspended bait.

5. An animal-operated advertising device comprising a base having an upright standard, chimes carried by the standard, rocker arms carried by the standard, the ends of the rocker arms having a strand connected thereto, a weight member on each strand adapted to contact the chimes upon rocking movement of the rocker arms, and means to impart movement to the rocker arms.

EDMOND OJALVO.